US008823830B2

(12) United States Patent
Ciuc et al.

(10) Patent No.: US 8,823,830 B2
(45) Date of Patent: *Sep. 2, 2014

(54) METHOD AND APPARATUS OF CORRECTING HYBRID FLASH ARTIFACTS IN DIGITAL IMAGES

(71) Applicant: DigitalOptics Corporation Europe Limited, Galway (IE)

(72) Inventors: Mihai Ciuc, Bucuresti (RO); Adrian Capata, Bucuresti (RO); Florin Nanu, Bucuresti (RO); Eran Steinberg, San Francisco, CA (US); Peter Corcoran, Claregalway (IE)

(73) Assignee: DigitalOptics Corporation Europe Limited, Ballybrit, Galway (IE)

( * ) Notice: Subject to any disclaimer, the term of this patent is extended or adjusted under 35 U.S.C. 154(b) by 0 days.

This patent is subject to a terminal disclaimer.

(21) Appl. No.: 13/658,775

(22) Filed: Oct. 23, 2012

(65) Prior Publication Data

US 2013/0044236 A1 Feb. 21, 2013

Related U.S. Application Data

(63) Continuation of application No. 13/357,548, filed on Jan. 24, 2012, now Pat. No. 8,422,780, which is a continuation of application No. 12/960,487, filed on Dec. 4, 2010, now Pat. No. 8,126,265, which is a continuation of application No. 12/558,859, filed on Sep. 14, 2009, now Pat. No. 7,865,036, which is a continuation of application No. 11/282,955, filed on Nov. 18, 2005, now Pat. No. 7,599,577.

(51) Int. Cl.
*H04N 9/73* (2006.01)
*H04N 5/20* (2006.01)
*G06T 5/00* (2006.01)

(52) U.S. Cl.
CPC .................... *G06T 5/005* (2013.01); *G06T 2207/30216* (2013.01)
USPC ............... 348/223.1; 348/225.1; 348/255

(58) Field of Classification Search
CPC .................. G06T 2207/30216; G06T 5/005
USPC ..................... 348/223.1, 225.1, 255
See application file for complete search history.

(56) References Cited

U.S. PATENT DOCUMENTS 4,549,801 A 10/1985 Winter
4,829,331 A 5/1989 Aihara
(Continued)

FOREIGN PATENT DOCUMENTS

EP 1 199 672 A2 4/2002
EP 1199672 A2 4/2002
(Continued)

OTHER PUBLICATIONS

Patent Abstracts of Japan, publication No. 2005-197809, publication date: Jul. 21, 2005, Image Processing Apparatus, Imaging Device, and Control Method Therefor.

(Continued)

*Primary Examiner* — Joel Fosselman
(74) *Attorney, Agent, or Firm* — Hickman Palermo Truong Becker Bingham Wong LLP

(57) ABSTRACT

A method for digital image eye artifact detection and correction include identifying one or more candidate red-eye defect regions in an acquired image. For one or more candidate red-eye regions, a seed pixels and/or a region of pixels having a high intensity value in the vicinity of the candidate red-eye region is identified. The shape, roundness or other eye-related characteristic of a combined hybrid region including the candidate red-eye region and the region of high intensity pixels is analyzed. Based on the analysis of the eye-related characteristic of the combined hybrid region, it is determined whether to apply flash artifact correction, including red eye correction of the candidate red-eye region and/or correction of the region of high intensity pixels.

18 Claims, 2 Drawing Sheets

(56) References Cited

U.S. PATENT DOCUMENTS

| | | | |
|---|---|---|---|
| 5,231,674 | A | 7/1993 | Cleaveland et al. |
| 5,528,333 | A | 6/1996 | Lee |
| 5,649,238 | A | 7/1997 | Wakabayashi et al. |
| 5,678,073 | A | 10/1997 | Stephenson, III et al. |
| 5,708,866 | A | 1/1998 | Leonard |
| 6,011,585 | A | 1/2000 | Anderson |
| 6,125,213 | A | 9/2000 | Morimoto |
| 6,407,777 | B1 | 6/2002 | DeLuca |
| 6,734,911 | B1 | 5/2004 | Lyons |
| 6,873,743 | B2 | 3/2005 | Steinberg |
| 6,980,691 | B2 | 12/2005 | Nesterov et al. |
| 7,027,643 | B2 | 4/2006 | Comaniciu et al. |
| 7,042,505 | B1 | 5/2006 | DeLuca |
| 7,130,453 | B2 | 10/2006 | Kondo et al. |
| 7,574,069 | B2 | 8/2009 | Setlur et al. |
| 7,593,603 | B1 | 9/2009 | Wilensky |
| 7,599,577 | B2 | 10/2009 | Ciuc et al. |
| 7,613,332 | B2 | 11/2009 | Enomoto et al. |
| 7,619,665 | B1 | 11/2009 | DeLuca |
| 7,630,006 | B2 | 12/2009 | DeLuca et al. |
| 7,657,060 | B2 | 2/2010 | Cohen et al. |
| 7,702,149 | B2 | 4/2010 | Ohkubo et al. |
| 7,747,071 | B2 | 6/2010 | Yen et al. |
| 7,801,335 | B2 | 9/2010 | Hanna et al. |
| 7,804,531 | B2 | 9/2010 | DeLuca et al. |
| 7,819,525 | B2 | 10/2010 | Connell, II |
| 7,847,839 | B2 | 12/2010 | DeLuca et al. |
| 7,847,840 | B2 | 12/2010 | DeLuca et al. |
| 8,334,926 | B2 | 12/2012 | Nanu et al. |
| 8,520,093 | B2 | 8/2013 | Nanu et al. |
| 2002/0089514 | A1 | 7/2002 | Kitahara et al. |
| 2002/0150292 | A1 | 10/2002 | O'Callaghan |
| 2002/0176623 | A1 | 11/2002 | Steinberg |
| 2003/0039402 | A1 | 2/2003 | Robins et al. |
| 2003/0086134 | A1 | 5/2003 | Enomoto |
| 2003/0086164 | A1 | 5/2003 | Abe |
| 2003/0118217 | A1 | 6/2003 | Kondo et al. |
| 2003/0161506 | A1 | 8/2003 | Velazquez et al. |
| 2004/0041924 | A1 | 3/2004 | White et al. |
| 2004/0057622 | A1 | 3/2004 | Bradski |
| 2004/0109614 | A1 | 6/2004 | Enomoto et al. |
| 2004/0170304 | A1 | 9/2004 | Haven et al. |
| 2005/0013603 | A1 | 1/2005 | Ichimasa |
| 2005/0041121 | A1 | 2/2005 | Steinberg et al. |
| 2005/0199783 | A1 | 9/2005 | Wenstrand et al. |
| 2005/0232481 | A1 | 10/2005 | Wu |
| 2005/0270486 | A1 | 12/2005 | Teiwes et al. |
| 2006/0147094 | A1 | 7/2006 | Yoo |
| 2006/0193515 | A1 | 8/2006 | Kim et al. |
| 2006/0204052 | A1 | 9/2006 | Yokouchi |
| 2006/0257132 | A1 | 11/2006 | Shiffer et al. |
| 2006/0280361 | A1 | 12/2006 | Umeda |
| 2006/0280375 | A1 | 12/2006 | Dalton et al. |
| 2007/0098260 | A1 | 5/2007 | Yen et al. |
| 2007/0147811 | A1 | 6/2007 | Nakao et al. |
| 2007/0263928 | A1 | 11/2007 | Akahori |
| 2008/0112599 | A1 | 5/2008 | Capata et al. |
| 2008/0211936 | A1 | 9/2008 | Ichimasa |
| 2008/0219515 | A1 | 9/2008 | Namgoong |
| 2008/0219518 | A1 | 9/2008 | Steinberg et al. |
| 2011/0222730 | A1 | 9/2011 | Steinberg et al. |
| 2012/0120274 | A1 | 5/2012 | Ciuc et al. |
| 2013/0044199 | A1 | 2/2013 | Nanu et al. |

FOREIGN PATENT DOCUMENTS

| | | |
|---|---|---|
| EP | 1 528 509 A2 | 5/2005 |
| EP | 1528509 A2 | 5/2005 |
| EP | 1754997 A1 | 2/2007 |
| EP | 2 227 002 A2 | 9/2008 |
| EP | 2 165 523 B1 | 4/2011 |
| GB | 2409287 A | 10/1925 |
| JP | 3205989 A2 | 9/1991 |
| JP | 04-104532 A | 4/1992 |
| JP | 06-301090 A | 10/1994 |
| JP | 7281285 A2 | 10/1995 |
| JP | 10-039379 A | 2/1998 |
| JP | 10233929 A | 9/1998 |
| JP | 11175699 A | 7/1999 |
| JP | 411284874 A | 10/1999 |
| JP | 2000125320 A | 4/2000 |
| JP | 2003179807 A | 6/2003 |
| JP | 2005-196385 A | 8/2004 |
| JP | 2004-242141 A | 7/2005 |
| JP | 2005-197809 A | 7/2005 |
| JP | 2006285956 A | 10/2006 |
| JP | 2007-174566 A | 7/2007 |
| WO | WO 03/019473 A1 | 3/2003 |
| WO | 03/071484 A1 | 8/2003 |
| WO | WO 03/071484 A1 | 8/2003 |
| WO | WO 2005/015896 A1 | 2/2005 |
| WO | WO 2005/076217 A2 | 8/2005 |
| WO | WO 2005/076217 A9 | 10/2005 |
| WO | WO 2005/076217 A3 | 4/2006 |
| WO | WO 2007/057063 A1 | 5/2007 |
| WO | WO 2008/109708 A1 | 9/2008 |
| WO | 2010/017953 A1 | 2/2010 |
| WO | WO 2010/017953 A1 | 2/2010 |
| WO | WO 2010/025908 A1 | 3/2010 |

OTHER PUBLICATIONS

Patent Abstracts of Japan, publication No. 04-104532, publication date: Apr. 7, 1992, Television Audience Rating Measuring Instrument.

Patent Abstracts of Japan, publication No. 2007-174566, publication date: Jul. 5, 2007, Compound-Eye Imaging Apparatus.

Amit Agrawal, Ramesh Raskar, Shree K. Nayar, Yuanzhen Li, Removing photography artifacts using gradient projection and flash-exposure sampling, ACM Transactions on Graphics (TOG)—Proceedings of ACM SIGGRAPH 2005 TOG, vol. 24 Issue 3, Jul. 2005, ACM New York, NY, USA, pp. 828-835, XP002442303, ISSN: 0730-0301, DOI:http://dx.doi.org/10.1145/1073204.1073269.

Notice of Allowance, dated Sep. 24, 2012, for U.S. Appl. No. 13/164,685, filed Jun. 20, 2011.

PCT Notification of Transmittal of the International Search Report and the Written Opinion of the International Searching Authority, or the Declaration, for PCT Application No. PCT/EP2009/005809, dated Nov. 24, 2009, 12 pages.

PCT Notification of Transmittal of International Preliminary Report on Patentability Chapter I (IB/326), International Preliminary Report on Patentability Chapter I (IB/373), for PCT Application No. PCT/EP2009/005809, report dated Feb. 15, 2011, 9 pages.

Smolka B., Czubin K., Hardeberg J. Y., Plataniotis K. N., Szczepanski M., Wojciechowski K.: Pattern Recognition Letters, Jul. 1, 2003, Elsevier, Amsterdam, NL, vol. 24, Nr:11, pp. 1767-1785 Publication info: XP 004416063.

Gaubatz M., Ulichney R., Automatic red-eye detection and correction, International Conference on Image Processing (ICIP), Sep. 22, 2002-Sep. 25, 2002, vol. 1, pp. 804-807 Publication info: XP 010607446.

Patent Abstracts of Japan, for Publication No. 2004-242141. Date of publication of application: Aug. 24, 2004, Application No. 2003-030541, Color Defective Area Correction Method, Color Defective Area Correction Processing Program, and Image Processing Apparatus.

Patent Abstracts of Japan, for Publication No. 2005-196385. Date of publication of application: Jul. 21, 2005, Application No. 2004-001007. Image Processing Apparatus, Image Processing Method and Digital Camera.

Non-Final Rejection, dated Sep. 17, 2013, for U.S. Appl. No. 13/656,737, filed Oct. 21, 2012.

English Language Translation of JP 411284874 A. Document-identifier: JP 11284874 A. 2 Pages.

Gaubatz M., Ulichney R., Automatic red-eye detection and correction, International Conference on Image Processing (ICIP), (Sep. 22, 2002); (Sep. 22-Sep. 25, 2002), vol. 1,pp. 804-807, XP 010607446.

Smolka B., Czubin K., Hardeberg J. Y., Plataniotis K. N., Szczepanski M., Wojciechowski K., Towards automatic redeye effect

(56) References Cited

OTHER PUBLICATIONS removal, Pattern Recognition Letters, 20030701, vol. 24, Nr:11, pp. 1767-1785 Publication info: XP 004416063, Elsevier, Amsterdam, NL EC.
EPO Extended European Search Report, for European application No. 10164430.0, dated Sep. 6, 2010, including the extended European search report, pursuant to Rule 62 EPC, The European search report (R. 61 EPC) or the partial European search report/declaration of no search (R. 63 EPC) and the European search opinion, 8 pages.
Corinne Vachier, Luc Vincent, Valuation of Image Extrema Using Alternating Filters by Reconstruction, Proceedings of the SPIE—The International Society for Optical Engineering, 1995, vol. 2568, pp. 94-103.
EPO Communication pursuant to Article 94(3) EPC, for European patent application No. 05707215.9, report dated Sep. 14, 2010, 11 Pages.
EPO Communication under Rule 71(3) EPC, for European patent application No. 09706058.6, report dated Oct. 4, 2010, 6 Pages.
PCT Notification of Transmittal of the International Search Report and the Written Opinion of the International Searching Authority, or the Declaration, for PCT Application No. PCT/US2008/055964, dated Jul. 30, 2008, 8 pages.
PCT Written Opinion of the International Searching Authority, for PCT Application No. PCT/US2008/055964, dated Jul. 24, 2008, 5 pages.
PCT International Preliminary Report on Patentability, for PCT Application No. PCT/US2008/055964, dated Sep. 8, 2009, 6 pages.
Cuiping Zhang and Fernand S. Cohen, Component-Based Active Appearance Models for Face Modelling, D. Zhang and A.K. Jain (Eds.): ICB 2006, LNCS 3832, pp. 206-212, 2005, Springer-Verlag Berlin Heidelberg 2005.
Fundus Photograph Reading Center—Modified 3-Standard Field Color Fundus Photography and Fluorescein Angiography Procedure, Retrieved from the Internet on Oct. 19, 2011, URL: http://eyephoto.ophth.wisc.edu/Photography/Protocols/mod3-ver1.4.html, 3 Pages.
Anatomy of the Eye, Retrieved from the Internet on Oct. 19, 2011, URL: http://www.stlukeseye.com/anatomy, 3 pages.
Fovea centralis, Retrieved from the Internet on Oct. 19, 2011, URL:http://en.wikipedia.org/wiki/Fovea, 4 pages.
Non-Final Office Action mailed Apr. 28, 2011, for U.S. Appl. No. 11/936,085, filed Nov. 7, 2007.
Non-Final Office Action mailed Apr. 28, 2011, for U.S. Appl. No. 11/937,377, filed Nov. 8, 2007.
Non-Final Office Action mailed Mar. 31, 2011, for U.S. Appl. No. 12/551,312, filed Aug. 31, 2009.
Non-Final Office Action mailed May 2, 2011, for U.S. Appl. No. 12/824,214, filed Jun. 27, 2010.
Notice of Allowance mailed Feb. 4, 2011, for U.S. Appl. No. 12/611,387, filed Nov. 3, 2009.
Notice of Allowance mailed Mar. 3, 2011, for U.S. Appl. No. 12/543,405, filed Aug. 18, 2009.
Final Office Action mailed Feb. 16, 2011, for U.S. Appl. No. 12/543,405, filed Aug. 18, 2009.
Final Office Action mailed Jan. 5, 2011, for U.S. Appl. No. 12/611,387, filed Nov. 3, 2009.
Notice of Allowance mailed May 12, 2011, for U.S. Appl. No. 12/043,025, filed Mar. 5, 2008.
Final Office Action mailed Feb. 2, 2011, for U.S. Appl. No. 12/613,457, filed Nov. 5, 2009.
Notice of Allowance mailed Mar. 17, 2011, for U.S. Appl. No. 12/042,335, filed Mar. 5, 2008.
Patent Abstracts of Japan, for Publication No. JP2002-247596, published Aug. 30, 2002, (Appl. No. 2001-044807), Program for Specifying Red Eye Area in Image, Image Processor and Recording Medium. 1 Page.
Agrawal A. et al., "Removing photography artifacts using gradient projection and flash-exposure sampling" ACM Transactions on Graphics , 2005, pp. 828-835.
Final Office Action mailed Apr. 26, 2010, for U.S. Appl. No. 10/773,092, filed Feb. 4, 2004.
Final Office Action mailed Apr. 26, 2010, for U.S. Appl. No. 11/690,834, filed Mar. 25, 2007.
Final Office Action mailed Apr. 26, 2010, for U.S. Appl. No. 11/772,427, filed Feb. 2, 2007.
Final Office Action mailed Apr. 26, 2010, for U.S. Appl. No. 12/035,416, filed Feb. 21, 2008.
Final Office Action mailed Mar. 24, 2010, for U.S. Appl. No. 11/462,035, filed Aug. 2, 2006.
Final Office Action mailed Nov. 20, 2009, for U.S. Appl. No. 12/192,897, filed Aug. 15, 2008.
Non-Final Office Action mailed Aug. 30, 2010, for U.S. Appl. No. 11/841,855, filed Aug. 20, 2007.
Non-Final Office Action mailed Aug. 5, 2010, for U.S. Appl. No. 11/462,035, filed Aug. 2, 2006.
Non-Final Office Action mailed May 3, 2010, for U.S. Appl. No. 12/187,763, filed Aug. 7, 2008.
Non-Final Office Action mailed May 4, 2010, for U.S. Appl. No. 12/192,335, filed Aug. 15, 2008.
Non-Final Office Action mailed Oct. 29, 2009, for U.S. Appl. No. 12/194,148, filed Aug. 19, 2008.
Non-Final Office Action mailed Sep. 17, 2010, for U.S. Appl. No. 11/690,834, filed Mar. 25, 2007.
Non-Final Office Action mailed Sep. 21, 2010, for U.S. Appl. No. 10/773,092, filed Feb. 4, 2004.
Notice of Allowance mailed Feb. 1, 2010, for U.S. Appl. No. 10/919,226, filed Aug. 16, 2004.
Notice of Allowance mailed Feb. 19, 2010, for U.S. Appl. No. 12/119,614, filed May 13, 2008.
Notice of Allowance mailed Feb. 19, 2010, for U.S. Appl. No. 12/194,148, filed Aug. 19, 2008.
Notice of Allowance mailed Jun. 27, 2010, for U.S. Appl. No. 12/192,897, filed Aug. 15, 2008.
Notice of Allowance mailed Nov. 18, 2009, for U.S. Appl. No. 11/282,954, filed Nov. 18, 2005.
Notice of Allowance mailed Oct. 15, 2010, for U.S. Appl. No. 11/554,539, filed Oct. 30, 2006.
PCT Notification of Transmittal of the International Search Report and the Written Opinion of the International Searching Authority, or the Declaration, for PCT Application No. PCT/EP2009/006361, report dated Nov. 24, 2009, 10 pages.
Tatsutoshi Kitajima (JP04-192681 English Translation; Electronic Camera, Jul. 10, 1992).
Non-Final Rejection, dated Oct. 17, 2012, for U.S. Appl. No. 13/357,548, filed Jan. 24, 2012.

METHOD AND APPARATUS OF CORRECTING HYBRID FLASH ARTIFACTS IN DIGITAL IMAGES

CROSS-REFERENCE TO RELATED APPLICATIONS

This application is a Continuation of U.S. patent application Ser. No. 13/357,548, filed Jan. 24, 2012; which is a Continuation of U.S. patent application Ser. No. 12/960,487, filed Dec. 4, 2010, now U.S. Pat. No. 8,126,265; which is a Continuation of U.S. patent application Ser. No. 12/558,859, filed on Sep. 14, 2009, now U.S. Pat. No. 7,865,036; which is a Continuation of U.S. patent application Ser. No. 11/282,955, filed on Nov. 18, 2005, now U.S. Pat. No. 7,599,577, entitled, "Method and Apparatus of Correcting Hybrid Flash Artifacts in Digital Images."

BACKGROUND

1. Field of the Invention

The present invention relates to digital image correction, and particularly to correction of eye artifacts due to flash exposure.

2. Description of the Related Art

U.S. Pat. No. 6,873,743 to Steinberg, which is hereby incorporated by reference, discloses an automatic, red-eye detection and correction system for digital images including a red-eye detector module that determines without user intervention if a red-eye defect exists. If a defect is located in an image the portion of the image surrounding the defect is passed to a correction module that de-saturates the red components of the defect while preserving the other color characteristics of the defect region.

WO03/071484, Pixology, discloses a method of detecting red-eye features in a digital image comprising identifying highlight i.e. glint regions of the image having pixels with a substantially red hue and higher saturation and lightness values than pixels in the regions therearound. In addition, pupil regions comprising two saturation peaks either side of a saturation trough may be identified. It is then determined whether each highlight or pupil region corresponds to part of a red-eye feature on the basis of further selection criteria, which may include determining whether there is an isolated, substantially circular area of correctable pixels around a reference pixel. Correction of red-eye features involves reducing the lightness and/or saturation of some or all of the pixels in the red-eye feature.

In many cases, the eye-artifact that is caused by the use of flash is more complex than a mere combination of red color and a highlight glint. Such artifacts can take the form of a complex pattern of hybrid portions that are red and other portions that are yellow, golden, white or a combination thereof. One example includes the case when the subject does not look directly at the camera when a flash photograph is taken. Light from the flash hits the eye-ball at an angle which may provoke reflections different than retro-reflection, that are white or golden color. Other cases include subjects that may be wearing contact lenses or subjects wearing eye glasses that diffract some portions of the light differently than others. In addition, the location of the flash relative to the lens, e.g. under the lens, may exacerbate a split discoloration of the eyes.

SUMMARY OF THE INVENTION

A technique is provided for digital image artifact correction as follows. A digital image is acquired. A candidate red-eye defect region is identified in the image. A region of high intensity pixels is identified which has at least a threshold intensity value in a vicinity of said candidate red-eye region. An eye-related characteristic of a combined hybrid region is analyzed. The combined hybrid region includes the candidate red-eye region and the region of high intensity pixels. The combined hybrid region is identified as a flash artifact region based on the analyzing of the eye-related characteristic. Flash artifact correction is applied to the flash artifact region.

The flash artifact correction may include red-eye correction of the candidate red-eye region. The flash artifact correction may also include correction of the region of high intensity pixels.

A bounding box may be defined around the candidate red-eye defect region. The identifying of the region of high intensity pixels may comprise identifying a seed high intensity pixel by locating said seed high intensity pixel within said bounding box. The seed pixel may have a yellowness above a pre-determined threshold and a redness below a pre-determined threshold. The region of high intensity pixels may be defined around the seed pixel.

The analyzing may include calculating a difference in roundness between the candidate red-eye region and the combined region. The red-eye correction may be applied when the roundness of the combined hybrid region is greater than a threshold value.

The method may include determining to apply red-eye correction when a roundness of the combined hybrid region is greater than a roundness of the candidate red-eye region by a threshold amount.

The method may include determining to not apply correction when the region of high intensity pixels includes greater than a threshold area. The area may be determined as a relative function to the size of said bounding box.

The method may include determining a yellowness and a non-pinkness of the region of high intensity pixels. The acquired image may be in LAB color space, and the method may include measuring an average b value of the region of high intensity pixels and determining a difference between an average a value and the average b value of the region of high intensity pixels.

The analyzing may include analyzing the combined hybrid region for the presence of a glint, and responsive to detecting a glint, determining to not correct the region of high intensity pixels responsive to the presence of glint.

The method may include correcting the region of high intensity pixels by selecting one or more pixel values from a corrected red-eye region and employing the pixel values to correct the region of high intensity pixels. The selected pixel values may be taken from pixels having L and b values falling within a median for the corrected red-eye region.

The method may include determining to not apply correction when an average b value of the region of high intensity pixels exceeds a relatively low threshold or if a difference between average a and b values is lower than a pre-determined threshold.

The method may include converting the acquired image to one of RGB, YCC or Lab color space formats, or combinations thereof.

The analyzing of the acquired image may be performed in Luminance chrominance color space and the region of high intensity pixels may have a luminance value greater than a luminance threshold, and blue-yellow chrominance values greater than a chrominance threshold and a red-green value less than a red-green threshold.

The method may include filtering the red-eye candidate regions to confirm or reject said regions as red-eye defect regions, and selecting a subset of the rejected red-eye candidate regions.

The method may be implemented within a digital image acquisition device. The method may be implemented as part of an image acquisition process. The method may be implemented as part of a playback option in the digital image acquisition device.

The method may be implemented to run as a background process in a digital image acquisition device. The method may be implemented within a general purpose computing device and wherein the acquiring may include receiving the digital image from a digital image acquisition device.

The candidate red-eye region and/or the region of high intensity pixels may be corrected. The region of high intensity pixels may be corrected after the red-eye candidate region. The correcting of the region of high intensity pixels may utilize corrected pixel values based on the candidate red-eye region. Results of correcting the candidate red-eye region and the region of high intensity pixels may be combined in such a manner as to obfuscate a seam between the regions. The method may include smoothing a seam region between the candidate red-eye region and the region of high intensity pixels.

The eye-related characteristic may include shape, roundness, and/or relative pupil size.

A further method is provided for digital image artifact correction. A digital image is acquired. A candidate red-eye defect region is identified in the image. A seed pixel is identified which has a high intensity value in the vicinity of the candidate red-eye region. An eye-related characteristic of a combined hybrid region is analyzed. The combined hybrid region includes the candidate red-eye region and the seed pixel. The combined hybrid region is identified as a flash artifact region based on the analyzing of the eye-related characteristic. Flash artifact correction is applied to the flash artifact region.

The flash artifact correction may include red-eye correction of the candidate red-eye region. The flash artifact correction may also include correction of a second region that includes the seed pixel.

The seed pixel may have a yellowness above a pre-determined threshold and a redness below a pre-determined threshold.

The method may include filtering the red-eye candidate regions to confirm or reject the regions as red-eye defect regions, and selecting a subset of the rejected red-eye candidate regions.

The method may be implemented within a digital image acquisition device. The method may be implemented as part of an image acquisition process. The method may be implemented as part of a playback option in the digital image acquisition device.

The method may be implemented to run as a background process in a digital image acquisition device. The method may be implemented within a general purpose computing device, and the acquiring may include receiving the digital image from a digital image acquisition device. The analyzing may include checking whether an average b value exceeds a relatively low threshold. The analyzing may include checking whether a difference between an average a value and the average b value is lower than a given threshold.

BRIEF DESCRIPTION OF THE DRAWINGS

Embodiments of the invention will now be described by way of example with reference to the accompanying drawings, in which.

DETAILED DESCRIPTION OF THE PREFERRED EMBODIMENTS

The preferred embodiments provide improved methods for detecting defects in subjects' eyes as well as methods for correcting such defects.

A preferred embodiment may operate by examining a candidate red eye region, looking in its neighborhood or vicinity for a possible yellow, white and/or golden patch belonging to the same eye, and, if any, under certain conditions correcting one or both of the red-eye or golden patch.

Using a technique in accordance with a preferred embodiment, the quality and acceptability of automatic eye correction can be increased for half red-half white/golden defects.

Implementations of the preferred embodiments can take advantage of the red part of the eye defect being detected by one automatic red-eye detection processing method, perhaps utilizing a conventional technique or a new technique, so the detection of the non-red regions can be applied as a pre-correction stage, and so that this method may take full advantage of existing or new detection methods. The correction parts of such red-eye processing may be altered to implement a technique in accordance with a preferred embodiment, while non correction parts preferably are not altered.

A technique in accordance with a preferred embodiment may provide a qualitative improvement in image correction with relatively little processing overhead making it readily implemented in cameras that may have limited processing capability and/or without unduly effecting the camera click-to-click interval.

It will be seen that pixels belonging to a red-eye defect may be corrected by reducing the red value of the pixel. As an example, image information may be available in Luminance-Chrominance space such as $L^*a^*b^*$ color space. This may involve reducing the $L^*$ and $a^*$ value of a pixel to a suitable level. In many cases, reduction of the $a^*$ value may automatically restore the chrominance of the eye thus restoring a true value of the iris.

However, for white/golden pixels of a half red-half white/golden eye defect, the L and possibly b characteristics of the pixel may also be either saturated and/or distorted. This means that unlike red eye defects, in these cases the original image information may be partially or even totally lost. The correction may be performed by reducing the overall $L^*$ value as well as reduction of the $a^*$ and $b^*$. However, because l* may be very high, the chrominance may be very low, thus there may not be significant color information remaining. In an additional preferred embodiment, correction of the white/golden portion of the defect involves reconstructing the eye, as opposed to the restoration described above from information from the corrected red eye portion of the defect.

Figure 3:
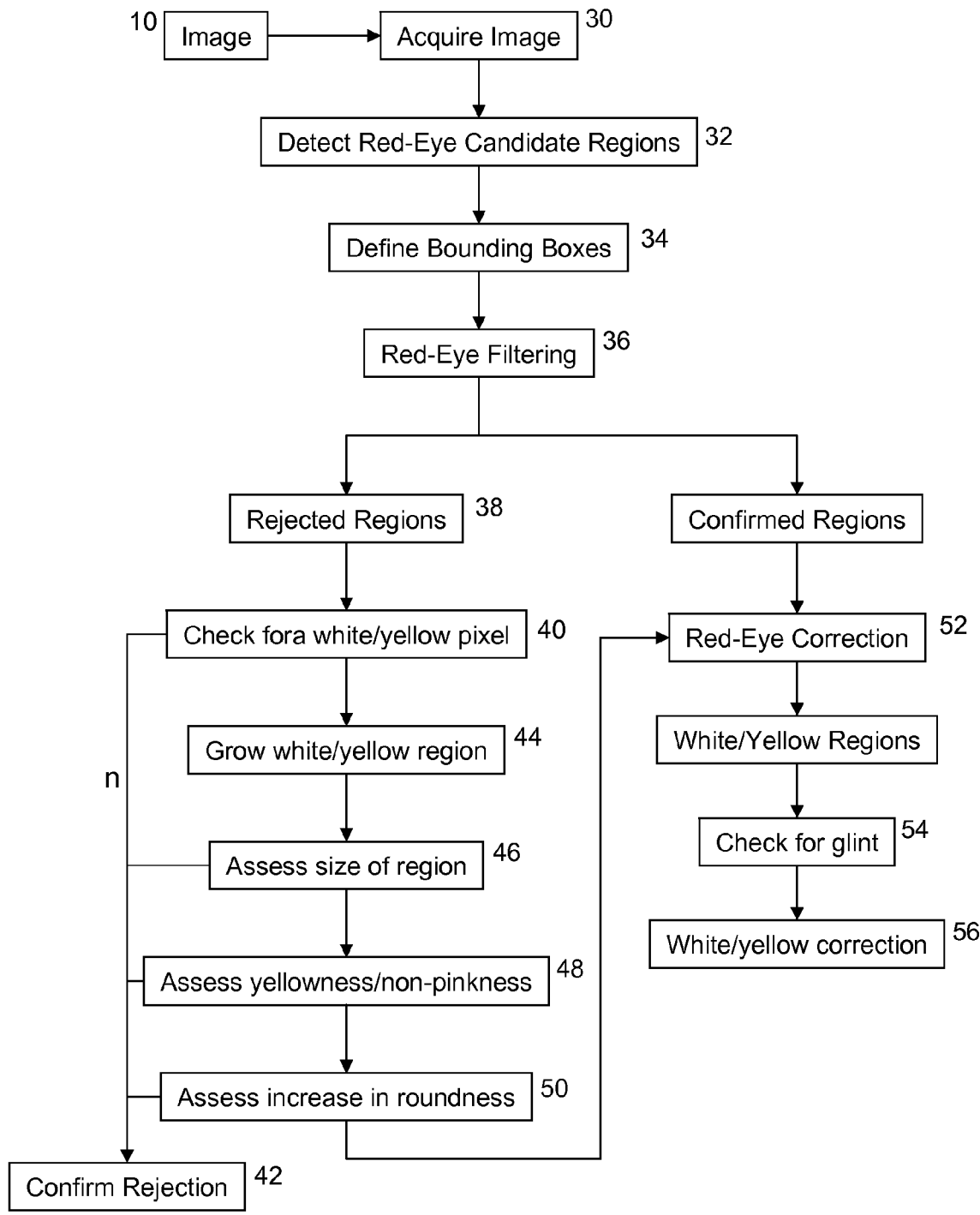
FIG. 3 illustrates a flow diagram of an embodiment of image correction software according to the present invention.

Referring now to FIG. 3, a digital image 10 may be acquired 30 in an otherwise conventional manner and/or utilizing some innovative technique. Where the embodiment is implemented in a device separate from a device such as a camera or scanner on which the image was originally acquired, the image may be acquired through file transfer by another suitable means including wired or wireless peer-to-peer or network transfer. Otherwise the image correction process described below, if suitably speed optimized, can either be implemented within the image acquisition chain of the image acquisition device for displaying a corrected image to a user before the user chooses to save and/or acquire a subsequent image; or alternatively, the image correction process can be analysis optimized to operate in the background on the image acquisition device on images which have been stored previously.

Figure 1:
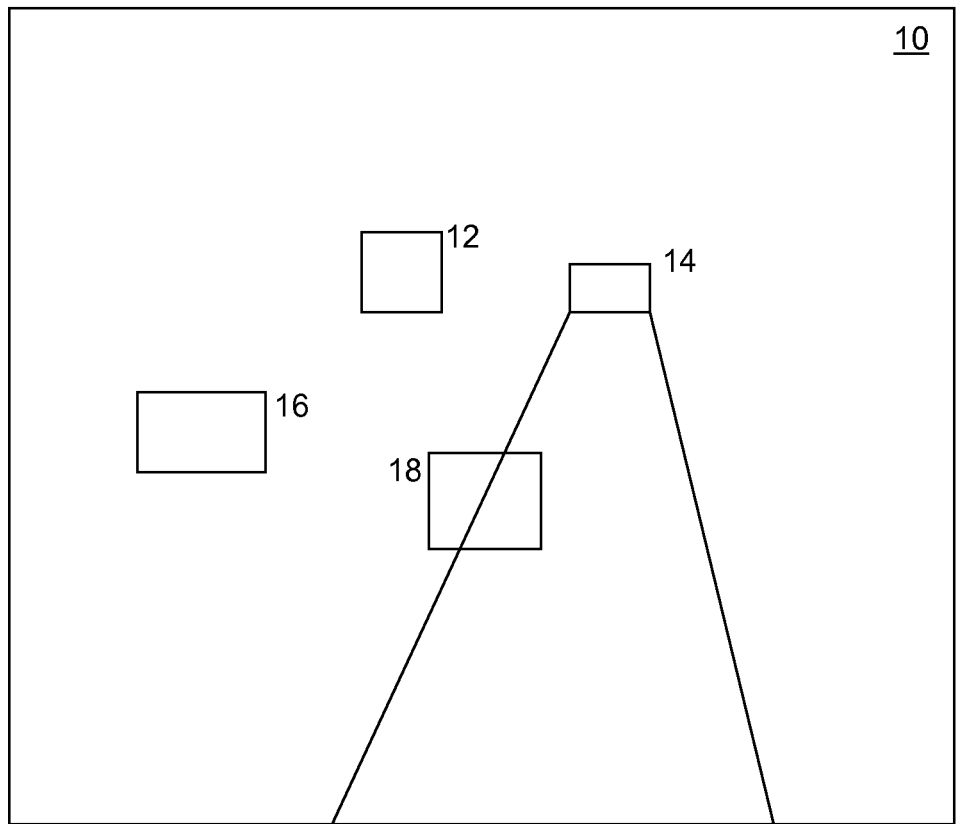
FIG. 1 illustrates an image in which several defect candidate regions have been identified and surrounded by bounding boxes.

Next, during red-eye detection 32, red-pixels 20 are identified and subsequently grouped into regions 22 comprising a plurality of contiguous (or generally contiguous) pixels (see, e.g., FIG. 2). These regions can be associated 34 with larger bounding box regions 12,14,16,18 (see, e.g., FIG. 1). The candidate regions contained within these bounding boxes are then passed through a set of filters 36 to determine whether the regions are in fact red-eye defects or not. Examples of such falsing filters are disclosed in U.S. Pat. No. 6,873,743.

Figure 2:
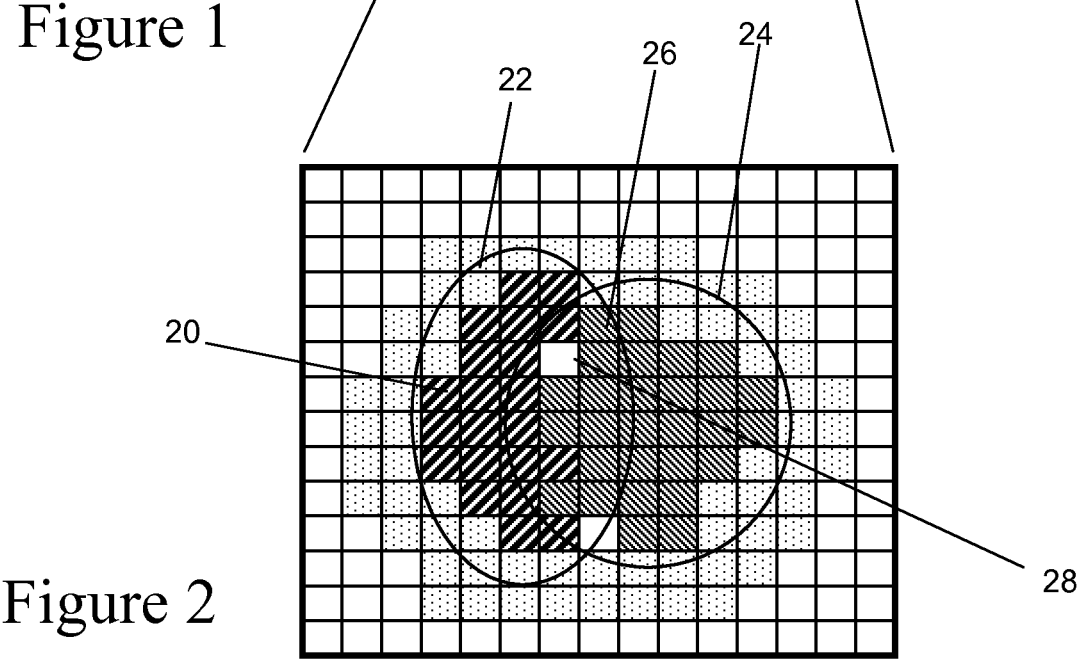
FIG. 2 shows in more detail a candidate region exhibiting a half-red half-white/golden defect.

One possible reason a filtering process might reject a candidate region, such as a region of red-pixels 20 as illustrated at FIG. 2, is that it lacks the roundness expected of a typical red-eye defect. Such regions as well as regions failed for other suitable reasons may be preferably passed as rejected regions 38 for further processing to determine if they include a half red—half white/golden eye defect—and if so for the defect to be corrected accordingly. Much of the operation of this processing can be performed in parallel with other red-eye processing (in for example a multi-processing environment) or indeed processing for each rejected region could be carried out to some extent in parallel.

Processing in accordance with an exemplary embodiment which may be involved in checking for half red-half white/golden eye defects is outlined in more detail as follows:

1. The bounding box 12-18 of an already detected red part of the eye artifact is searched 40 for a point, say 26 (see FIG. 2) having:
   a. High intensity (I>threshold)
   b. High yellowness (b>threshold)
   c. Low redness (a<threshold)

In this example, it is assumed that the image information for a region is available in Lab color space, although another embodiment could equally be implemented for image information in other formats such as RGB, YCC or indeed bitmap format.

If such a point does not exist, then STOP (i.e., the decision is taken that no white/golden patch exists in the vicinity of the red area) and confirm that the region is to be rejected 42.

2. Starting from a point detected in Step 40, grow 44 a region 24 (see FIG. 2) based on luminance information, for example, if luminance is greater than a threshold, a point is added to the white/golden region 24. If the region 24 exceeds a predefined maximum allowable size, step 46, then STOP and confirm that the region is to be rejected 42. The maximum allowable size can be determined from a ratio of the bounding box area vis-à-vis the overall area of the red 22 and white/golden region 24.

3. Yellowness and non-pinkness of the white region are then assessed 48 by checking that average b value exceeds a relatively low threshold, and the difference between average "a" and average "b" is lower than a given threshold. If at least one test fails, then STOP and confirm that the region is to be rejected 42.

4. In this embodiment, the increase of roundness of the combination of initial red 22 and detected white/golden regions 24 from the original red region 22 is checked 50. Thus, the roundness of the union of the red and white/golden regions is computed and compared with that of the red region 22. If roundness is less than a threshold value or decreased or not increased sufficiently by "adding" the white/golden region 24 to the red one 22, then STOP and reject the region 42. Roundness of a region is preferably computed using the formula $$\text{Roundness} = \frac{\text{Perimeter}^2}{4\pi \cdot \text{Area}}$$

Prior to assessing roundness, a hole filling procedure is preferably applied to each region 22,24 to include for example pixel 28 within the union.

5. If the region passes one or more and preferably all of the above tests, it is added to the list of confirmed red-eye regions. At this point, the red part of the eye defect can be corrected 52 in any of various manners, for example, by reducing the a value of pixels in Lab color space, while the pixels that were corrected are marked to be used in further processing.

6. For white/golden regions that were added to the list of red-eye defect regions, further correction of the white/golden portion of the defect can be applied, after some further checks. One such check is to detect glint 54. In RGB space, glint candidates are selected as high luminance pixels (for example, min(R, G)>=220 and max(R, G)==255). If a very round (e.g., in one or both of aspect ratio and elongation), luminous, and desaturated region is found within the interior of the current "red ∪ white" region 22,24, its pixels may be removed from the "pixels-to-correct" list. The glint may be the entire high luminance region but in most cases only a small part of the high luminance region will satisfy the criteria for glint pixels.

7. Where a glint is not detected or is small relative to the size of the white/golden region, the non-red eye artifact pixels 24 can be corrected 56 preferably taking color information from red pixels 22 which where already corrected at step 52, if such information after the correction exists. Alternatively, the correction can be done by reduction of the Luminance value. In the preferred embodiment, color information is derived from a selection of ex-red pixels with L and b values which lie in the median for that region (between the 30% and 70% points on a cumulative histogram for L and b). These color samples (from the already corrected red part of the eye) are used to create the same texture on both the red and non-red defect parts of the eye. It should be noted that the L and b histograms may be generally available from preprocessing steps, for example, those for determining various thresholds, and won't necessarily have changed during correction as the red correction may just involve reducing the a value of a pixel. It is possible that the correction of the red-eye region and the one for the high intensity region may show an unpleasant seam between the regions. In an alternative embodiment, the corrected region will be smoothed in such a manner that the seams between the two regions if exist, will be eliminated.

The present invention is not limited to the embodiments described above herein, which may be amended or modified without departing from the scope of the present invention as set forth in the appended claims, and structural and functional equivalents thereof.

In methods that may be performed according to preferred embodiments herein and that may have been described above and/or claimed below, the operations have been described in selected typographical sequences. However, the sequences have been selected and so ordered for typographical convenience and are not intended to imply any particular order for performing the operations.

In addition, all references cited above herein, in addition to the background and summary of the invention sections, are hereby incorporated by reference into the detailed description of the preferred embodiments as disclosing alternative embodiments and components.

The invention claimed is:

1. A digital image acquisition device comprising:
a lens;
an image sensor;
a processor; and
a computer readable medium having computer readable code embodied therein for programming the processor to analyze a digital image for segmenting an iris region from one or more adjacent sub-regions of an identified eye region within the image, wherein the device is configured to:
acquire a digital image;
identify a candidate eye region in said image;
determine one or more sub-regions of the candidate eye region each having an intensity value that is above or below one or more threshold intensity values;
identify an iris region and one or more adjacent sub-regions based on discerning chrominance values of pixels of the iris region and the one or more adjacent sub-regions; and
determine the iris region based on analyzing one or more chrominance values of pixels of at least one of the adjacent sub-regions.

2. The device of claim 1, the device being further configured to analyze a shape characteristic of the one or more sub-regions.

3. The device of claim 1, wherein said device is further configured to analyze said acquired image in Luminance chrominance color space and said image comprises a region of high intensity pixels having a luminance value greater than a luminance threshold.

4. The device of claim 3, wherein said region of high intensity pixels has blue-yellow chrominance values greater than a chrominance threshold.

5. The device of claim 4, wherein said region of high intensity pixels has a red-green value less than a red-green threshold.

6. The device of claim 1, wherein said device is further configured to analyze an eye-related characteristic comprising at least one of shape, roundness and pupil size.

7. A non-transitory computer readable medium having computer readable code embodied therein for programming one or more processors to analyze an acquired digital image for segmenting an iris region from one or more adjacent sub-regions of an identified eye region within the image, wherein the code is configured to program the one or more processors to:
identify a candidate eye region in said image;
determine one or more sub-regions of the candidate eye region each having an intensity value that is above or below one or more threshold intensity values;
identify an iris region and one or more adjacent sub-regions based on discerning chrominance values of pixels of the iris region and the one or more adjacent sub-regions; and
determine the iris region based on analyzing one or more chrominance values of pixels of at least one of the adjacent sub-regions.

8. The non-transitory computer readable medium of claim 7, the code being further configured to program the one or more processors to analyze a shape characteristic of the one or more sub-regions to further determine the iris region.

9. The non-transitory computer readable medium of claim 7, the code being further configured to program the one or more processors to analyze said acquired image in Luminance chrominance color space and said image comprises a region of high intensity pixels having a luminance value greater than a luminance threshold.

10. The non-transitory computer readable medium of claim 9, wherein said region of high intensity pixels has blue-yellow chrominance values greater than a chrominance threshold.

11. The non-transitory computer readable medium of claim 10, wherein said region of high intensity pixels has a red-green value less than a red-green threshold.

12. The non-transitory computer readable medium of claim 7, the code being further configured to program the one or more processors to analyze an eye-related characteristic comprising at least one of shape, roundness and pupil size to determine the iris region.

13. A method of segmenting an iris region from one or more adjacent sub-regions of an identified eye region within an acquired digital image, comprising
acquiring a digital image;
identifying a candidate eye region in said image;
determining one or more sub-regions of the candidate eye region each having an intensity value that is above or below one or more threshold intensity values;
identifying an iris region and one or more adjacent sub-regions based on discerning chrominance values of pixels of the iris region and the one or more adjacent sub-regions; and
determining the iris region based on analyzing one or more chrominance values of pixels of at least one of the adjacent sub-regions.

14. The method of claim 13, further comprising analyzing a shape characteristic of the one or more sub-regions to further determine the iris region.

15. The method of claim 13, further comprising analyzing said acquired image in Luminance chrominance color space and said image comprises a region of high intensity pixels having a luminance value greater than a luminance threshold.

16. The method of claim 15, wherein said region of high intensity pixels has blue-yellow chrominance values greater than a chrominance threshold.

17. The method of claim 16, wherein said region of high intensity pixels has a red-green value less than a red-green threshold.

18. The method of claim 13, further comprising analyzing an eye-related characteristic comprising at least one of shape, roundness and pupil size.

* * * * *